(12) United States Patent
Zhang et al.

(10) Patent No.: US 9,025,562 B2
(45) Date of Patent: May 5, 2015

(54) LOCAL MOBILITY SOLUTION WITH WIRED AND WIRELESS INTERFACE SWITCHING

(75) Inventors: Junbiao Zhang, Beijing (CN);
Guillaume Bichot, La Chaussee (FR);
Saurabh Mather, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1333 days.

(21) Appl. No.: 11/795,919

(22) PCT Filed: Jan. 31, 2005

(86) PCT No.: PCT/US2005/002914
§ 371 (c)(1),
(2), (4) Date: Jul. 24, 2007

(87) PCT Pub. No.: WO2006/085841
PCT Pub. Date: Aug. 17, 2006

(65) Prior Publication Data
US 2008/0130572 A1    Jun. 5, 2008

(51) Int. Cl.
*H04W 36/18* (2009.01)
*H04L 12/54* (2013.01)
*H04W 80/00* (2009.01)
*H04W 92/02* (2009.01)

(52) U.S. Cl.
CPC ........... *H04W 36/18* (2013.01); *H04L 12/5692* (2013.01); *H04W 80/00* (2013.01); *H04W 92/02* (2013.01)

(58) Field of Classification Search
CPC ..... H04W 36/18; H04W 92/02; H04W 80/00; H04L 12/5692

USPC .......................................... 370/331, 338, 329
See application file for complete search history.

(56) References Cited

U.S. PATENT DOCUMENTS

| | | | | |
|---|---|---|---|---|
| 6,847,621 | B1 * | 1/2005 | Asahina ....................... | 370/331 |
| 6,917,804 | B2 * | 7/2005 | Takayama et al. .......... | 455/432.1 |
| 7,046,666 | B1 * | 5/2006 | Bollay et al. .................. | 370/392 |
| 7,151,758 | B2 * | 12/2006 | Kumaki et al. ............... | 370/331 |
| 7,885,205 | B2 * | 2/2011 | Jeansonne et al. ............ | 370/254 |
| 2003/0185233 | A1 * | 10/2003 | Ji et al. .......................... | 370/466 |
| 2004/0100923 | A1 * | 5/2004 | Yam .............................. | 370/328 |
| 2004/0266424 | A1 * | 12/2004 | Park et al. ................... | 455/426.1 |

FOREIGN PATENT DOCUMENTS

| EP | 1326392 | 7/2003 |
|---|---|---|
| EP | 1349322 | 10/2003 |

OTHER PUBLICATIONS

N. Montavont et al: "Description and evaluation of mobile ipv6 for multiple interfaces", Wireless Communications and Networking Conference, 2004, IEEE Atlanta, GA USA, Mar. 21-25, 2004, vol. 1, pp. 144-148.
Search Report Dated Oct. 12, 2005.

* cited by examiner

*Primary Examiner* — Mohammad Anwar
(74) *Attorney, Agent, or Firm* — Joel M. Fogelson; Vincent E. Duffy

(57) ABSTRACT

There is provided a method for switching a mobile terminal from a first network interface to a second network interface in a local network environment. The method includes the step of utilizing a same Internet Protocol (IP) address by the mobile terminal for both the first network interface and the second network interface.

36 Claims, 3 Drawing Sheets

LOCAL MOBILITY SOLUTION WITH WIRED AND WIRELESS INTERFACE SWITCHING

This application claims the benefit, under 35 U.S.C. §365 of International Application PCT/US2005/002914, filed Jan. 31, 2005, which was published in accordance with PCT Article 21(2) on Aug. 17, 2006 in English.

FIELD OF THE INVENTION

The present invention generally relates to network mobility and, more particularly, to a method and mobile terminal that provide seamless switching from a first network interface to a second network interface within the same local network.

BACKGROUND OF THE INVENTION

When a user moves his laptop in and out of a docking station, the user most likely will be switching network connections between an Ethernet and a Wireless Local Area Network (WLAN) (or some other combination of LAN interfaces). Each interface has a different Internet Protocol (IP) address. Thus, when switching occurs, the source/destination addresses of any ongoing sessions on the laptop are changed. Many such sessions such as, for example, Transmission Control Protocol (TCP) based sessions (e.g., File Transfer Protocol (FTP), Hyper Text Transfer protocol (HTTP), and so forth) and media streaming sessions cannot survive such changes. Accordingly, session continuity cannot be maintained.

Mobile IP is one solution to this problem. However, due to complex nature of mobile IP both in terms of network requirements and terminal modifications, it is rarely used for mobility in a local environment.

Cellular IP is a micro mobility solution for a local environment. When a mobile terminal attaches to a different network segment, routers in the network are notified to update their forwarding tables. However, this solution is also rarely deployed because it requires significant changes to network routers.

Accordingly, it would be desirable and highly advantageous to have mobile solution that solves the above-described problems of the prior art.

SUMMARY OF THE INVENTION

The problems stated above, as well as other related problems of the prior art, are solved by the present invention, a method and mobile terminal that provide seamless switching from a first network interface to a second network interface within the same local network (i.e. both interfaces are reachable through the same layer 2 network domain).

According to an aspect of the present invention, there is provided a method for switching a mobile terminal from a first network interface to a second network interface in a local network environment. The method includes the step of utilizing a same Internet Protocol (IP) address by the mobile terminal for both the first network interface and the second network interface.

According to another aspect of the present invention, there is provided a mobile terminal capable of switching from a first network interface to a second network interface in a local network environment. The mobile terminal includes an Internet Protocol (IP) address reuse module for utilizing a same IP address by the mobile terminal for both the first network interface and the second network interface.

These and other aspects, features and advantages of the present invention will become apparent from the following detailed description of preferred embodiments, which is to be read in connection with the accompanying drawings.

DETAILED DESCRIPTION OF THE INVENTION

Figure 1:
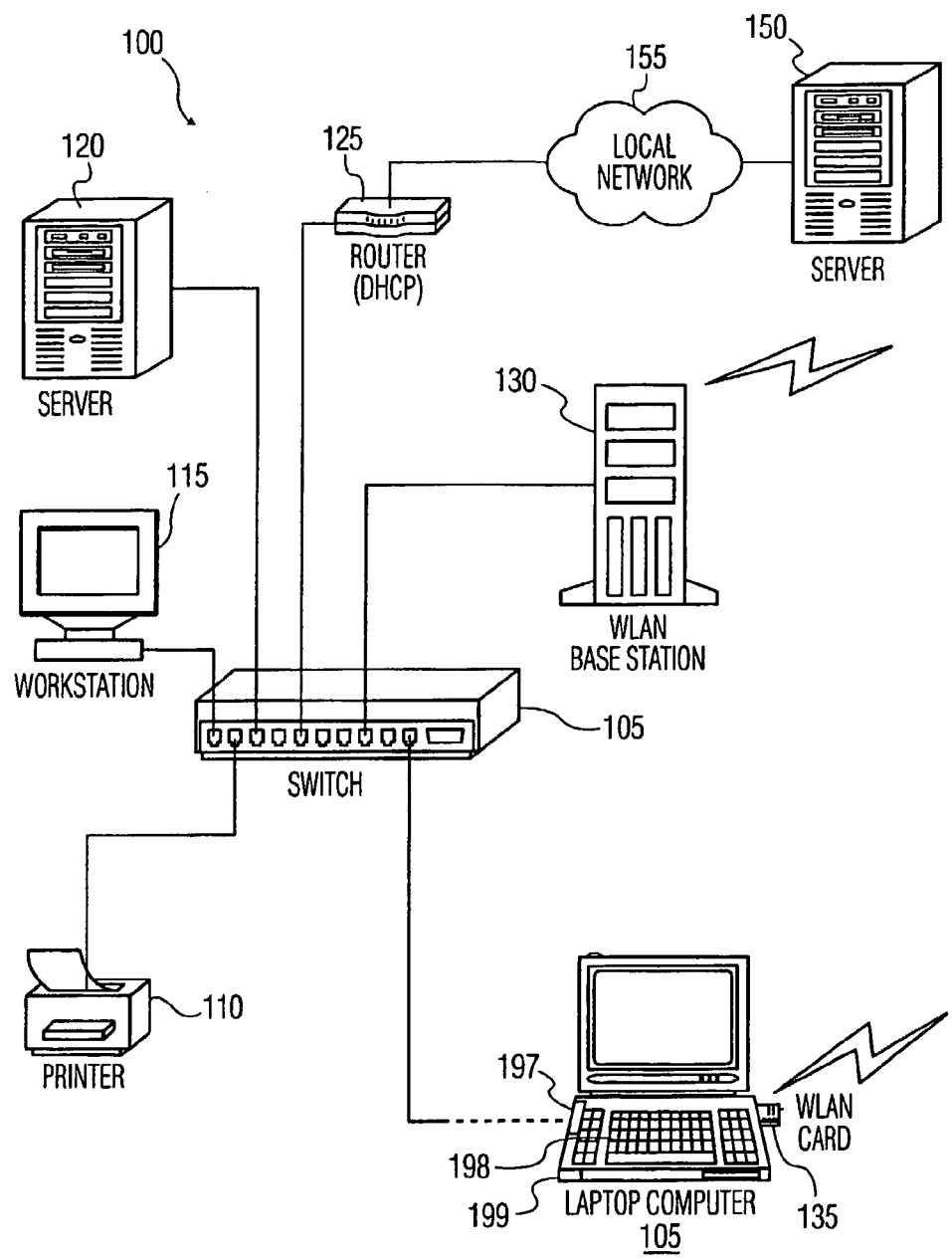
FIG. 1 is a block diagram illustrating a local network environment 100 to which the present invention may be applied, according to an illustrative embodiment of the present invention.

The present invention is directed to a method and mobile terminal that provide seamless switching from a first network interface to a second network interface within the same local network. The switch may be from a wired network interface to a wireless network interface or vice versa. Moreover, the switch may be from a wired network interface to another wired network interface or from a wireless network interface to another wireless network interface.

The present invention addresses the situation when a user switches from one network interface to another network interface in a local network environment. In contrast to the prior art approach to mobility that involves two interfaces each having a separate IP address, the present invention maintains only one IP address at any given time since only one active interface is necessary at any given time. This IP address is transferred from one interface to another during a mobility scenario. In the meantime, the change of the interface is announced to the network through standard protocols to facilitate fast layer two mobility bridging.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

An environment in which the present invention may be employed will now be described according to an illustrative embodiment of the present invention. The present invention is a local mobility solution and, thus, it is not optimal for global mobility from one network to another. Secondly, the present invention is applicable when the networks to which both network interfaces connect to belong to the same switched LAN.

FIG. 1 is a block diagram illustrating a local network environment 100 to which the present invention may be applied, according to an illustrative embodiment of the present invention. The local network environment 100 includes a switch 105 that is coupled to a printer 110, a workstation 115, a server 120, a router 125, and a WLAN base station 130. The switch is capable of interacting with a mobile terminal 105 via an Ethernet card 197 interconnected thereto. Moreover, the mobile terminal 105 is capable of interacting with the WLAN base station 130 via a WLAN card 135 interconnected thereto. The mobile terminal 105 advantageously includes an Internet Protocol (IP) address reuse module 199. The IP address reuse module 199 is for reusing at least the same IP address for two network interfaces and is optionally for also reusing the Media Access Control (MAC) address. The mobile terminal 105 further includes a user input device 198 and also an interface management module 196 for turning on and off the Ethernet card 197 and the WLAN card 135. Another server 150 is coupled to the router 125 over a local network 155.

In the illustrative embodiment of FIG. 1, the mobile terminal 105 is shown as a laptop computer and will be hereinafter interchangeably referred to as the same. However, it is to be appreciated that the present invention is not limited to only laptop computers with respect to mobile terminal 105 and, thus, other types of mobile devices may also be employed, while maintaining the spirit of the present invention. For example, the mobile terminal 105 may also be, for example, a Personal Digital Assistant (PDA), an enhanced cellular telephone, and so forth. It is to be further appreciated that while the present invention is described herein primarily with respect to a WLAN and an Ethernet, the present invention is not limited to the preceding and, thus, other types of networks and corresponding network interfaces may also be utilized in accordance with the present invention, while maintaining the spirit of the present invention.

A description will now be given of the present invention, according to an illustrative embodiment thereof.

Advantageously, the present invention utilizes existing network functions to achieve simpler, faster and seamless mobility, instead of using a complex new network and terminal components to perform encapsulation and forwarding as in the case of mobile IP and cellular IP. To achieve the preceding advantages over the prior art, the present invention configures the mobile terminal to always maintain a single IP address, irrespective of which interface is used by the mobile terminal. In other words, this IP address moves between the two interfaces whenever the user switches interfaces. In this way, the source addresses of the IP packets out of the mobile terminal are always the same, as well as the destination addresses of the packets into the mobile terminal. Thus, there is no problem in terms of a session break due to endpoint changes. Continuous mobility can then be supported through layer 2 switching instead of layer 3 routing. In other words, the layer 2 network updates the location information of the mobile terminal in the standard way just like when the mobile terminal with a wireless LAN interface moves from one wireless Access Point (AP) to another. Network layer 2 corresponds to the switches and terminals in the network. Network layer 3 corresponds to the routers in the network.

For illustrative purposes, the present invention will now be described with respect to an illustrative embodiment wherein the mobile terminal switches from an Ethernet interface to a WLAN interface. However, it is to be appreciated that the present invention is not limited to the preceding types of networks and, thus, other types of networks may also be employed while maintaining the spirit of the present invention. Moreover, it is to be appreciated that switches in the other direction (from the WLAN interface to the Ethernet interface) work the same way.

Before the mobile terminal switches interfaces, the Ethernet interface is first examined. All the necessary parameters are extracted. These Ethernet interface parameters include, but are not limited to, IP address, network mask, broadcast address, Domain Name System (DNS) server address, Dynamic Host Configuration Protocol (DHCP) server address (if any), and so forth.

The WLAN interface is turned on and these parameters are set on the WLAN interface. Local routing table entries are also updated accordingly to use the WLAN interface as the default interface. The Ethernet interface is then turned off.

The mechanism described thus far should already work, that is, the existing sessions can be maintained without any breaks. The problem, however, is that it is not yet seamless, since existing sessions may take some time to recover from temporary pauses. This is due to the fact that the layer 2 network takes some time to learn, from the packets sent out from the WLAN interface of the mobile terminal, that the mobile terminal has moved to a new location. Before this learning is completed inside the network, some of the packets destined for the IP address of the WLAN interface are still forwarded to the original Ethernet interface. Unfortunately, these packets will be lost.

Accordingly, a description will now be given of additional mechanisms for providing a smoother mobility transition, according to various illustrative embodiments of the present invention.

To make the transition smoother, the present invention advantageously utilizes gratuitous Address Resolution Protocol (ARP). APR is used by devices in a network to discover the layer 2 MAC (Media Access Control) addresses of other devices using the IP address of the other devices. Normally, an ARP packet is sent out when a sending device has an IP packet to deliver and does not know the layer 2 address of the destination device. The destination device with the specified IP address would then respond with its MAC address. Instead of passively waiting for other devices to query its MAC address, a device can also send a gratuitous ARP packet to announce its IP address and MAC address. This packet is broadcast in the network. When the mobile terminal switches interfaces and transfers the IP address, the mobile terminal can send out gratuitous ARP packets through the WLAN interface to the network. By doing so, all the switches and terminals in the network can immediately learn that the IP address has a new MAC address associated with it. Further, since the gratuitous ARP packet is sent to every switch in the network, the switches in the network can quickly figure out the reverse path that the packet travels, thus quickly knowing the path to reach the MAC address. In this way, the transition from one network to another network can be much smoother.

An alternative of the previous solution is to not only re-use the IP address but also the MAC address associated with the LAN (Ethernet) interface. This may be implemented, for example, by using the WLAN driver to configure the MAC address by software. In this solution, the mobile terminal first reads the MAC address from the LAN (Ethernet) interface, and writes this MAC address to the WLAN interface (this operation could be done in advance if the WLAN access is supposed to be used only when the Ethernet access is not used). The mobile terminal and/or an intermediate gateway (e.g., the Access Point (AP) in the case of switching towards a WLAN) then signal the handover to the newly attached switch. The last step is not mandatory but it enhances the process. By switching to another interface, the mobile terminal becomes indirectly attached (through the AP) to a new port of the same Ethernet switch to which it was previously attached. Moreover, the mobile terminal can even be attached to a new Ethernet switch. The Ethernet switch internally maintains an association table that maps an Ethernet MAC address with a port number. In order to enhance the seamless process, the mobile terminal (once switched to the new interface, the WLAN for example) or the access point (once the terminal is detected) signals its new layer two attachment using the LLC protocol.

A description will now be given of transition issues relation to network-to-network mobility in a local network environment.

It is very common for the Ethernet interface to use DHCP to obtain the network parameters (especially on portable devices). This leads to a couple of problems. First, the IP address information obtained from DHCP needs to be updated. Normally, there is a lifetime associated with the DHCP lease. As long as the DHCP lease does not expire, the new interface can use the IP address obtained by the old interface. To ensure that the IP address will not expire while the new interface is using the IP address, we can let the old interface renew the IP address prior to transition. For the embodiment of the present invention described herein that also updates the MAC address, this is not an issue since the new interface can renew the DHCP lease and the DHCP server sees the same MAC address and, thus, can grant the renewal.

Typically, when a user switches interfaces, the Ethernet interface is not explicitly turned off. The user just takes the Ethernet cable out to disconnect the interface. Although this event can be detected, the fixed Ethernet interface would have already lost information about the IP address, gateway, DNS, and so forth. Most of the time, this information can be obtained from the local DHCP cache of the device, but it may not be a reliable method.

One solution is to provide a user interface (UI) that allows the user to explicitly make the switch before the user disconnects the Ethernet cable. This UI could be a clickable button or some other interactive mechanism. This would prevent any packet loss and also gives the user an opportunity to decide if the user wants to make the switch.

Another alternative could be a monitor program that periodically queries the Ethernet interface for network parameters and stores this information. Whenever a switch is detected, the monitor program can transfer this information to the WLAN interface.

Figure 2:
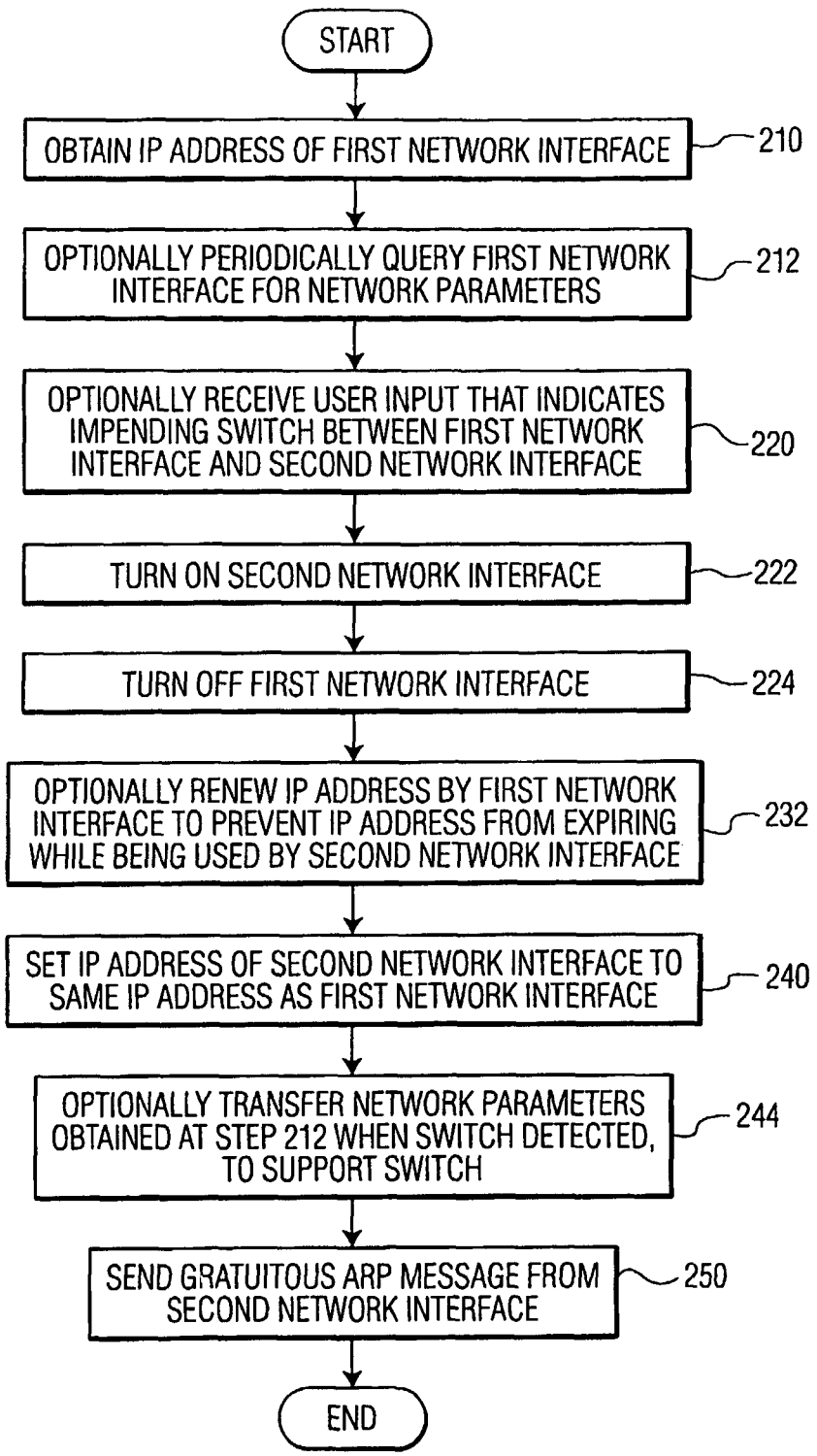
FIG. 2 is a flow diagram illustrating a method for switching from a first network interface to a second network interface in a local network environment, according to an illustrative embodiment of the present invention.

FIG. 2 is a flow diagram illustrating a method for switching from a first network interface to a second network interface in a local network environment, according to an illustrative embodiment of the present invention. In the illustrative embodiment of FIG. 2, the first network interface is an Ethernet interface corresponding to an Ethernet and the second network interface is a Wireless Local Area Network (WLAN) interface corresponding to a WLAN. However, it is to be appreciated that the present invention is not limited to the preceding networks and network interfaces described herein and, thus, other types of networks and network interfaces may also be utilized in accordance with the present invention, while maintaining the spirit of the present invention.

The Internet Protocol (IP) address of the first network interface is obtained (step 210).

Optionally, the first network interface is periodically queried by the mobile terminal for network parameters (step 212), Optionally, a user input is received that indicates an impending switch between the first network interface and the second network interface prior to an actual physical disconnection of the mobile terminal from the first network interface (e.g., before the Ethernet cable is disconnected from the Ethernet adapter of the mobile terminal) (step 220). In such a case, steps 222 and 224 that follow will be automatically performed by the mobile terminal (e.g., by interface management module 196). Otherwise, at least one of steps 222 and 224 may need to be performed manually by the user. It is to be appreciated that step 220 is performed either in lieu or prior to physically disconnecting the connection between the mobile terminal and the first network interface.

The second network interface is turned on (step 222). The first network interface is turned off (step 224).

Optionally, the IP address is renewed by the first network interface to prevent the IP address from expiring while being used by the second network interface (step 232).

The IP address of the second network interface is set to the same IP address as the first network interface (step 240). Optionally, the network parameters obtained at step 212, if any, are transferred to the second network interface when a switch is detected from the first network interface to the second network interface, to support the switch (step 244). A gratuitous Address Resolution Protocol (ARP) message is sent from the second network interface (step 250). The gratuitous ARP message is sent to the local network environment to provide an indication within the local network environment that the IP address has a new MAC address associated with it (namely, the MAC address of the second network interface). The indication may be provided, for example, to the level 2 portion of the local network environment.

Figure 3:
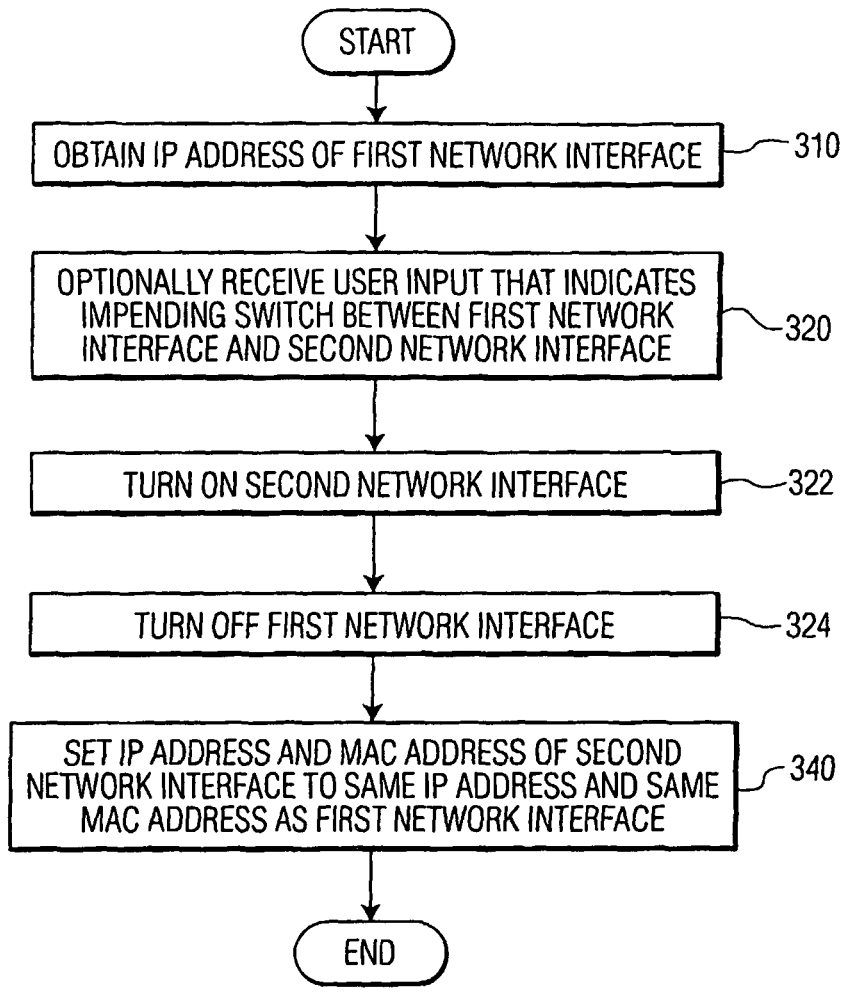
FIG. 3 is a flow diagram illustrating a method for switching from a first network interface to a second network interface in a local network environment, according to another illustrative embodiment of the present invention.

FIG. 3 is a flow diagram illustrating a method for switching from a first network interface to a second network interface in a local network environment, according to another illustrative embodiment of the present invention. In the illustrative embodiment of FIG. 3, the first network interface is an Ethernet interface corresponding to an Ethernet and the second network interface is a Wireless Local Area Network (WLAN) interface corresponding to a WLAN. However, it is to be appreciated that the present invention is not limited to the preceding networks and network interfaces described herein and, thus, other types of networks and network interfaces may also be utilized in accordance with the present invention, while maintaining the spirit of the present invention.

The Internet Protocol (IP) address and the Media Access Control (MAC) address of the first network interface are obtained (step 310).

Optionally, a user input is received that indicates an impending switch between the first network interface and the second network interface prior to an actual physical disconnection of the mobile terminal from the first network interface (e.g., before the Ethernet cable is disconnected from the Ethernet adapter of the mobile terminal) (step 320). In such a case, steps 322 and 324 that follow will be automatically performed by the mobile terminal (e.g., by interface management module 196). Otherwise, steps 322 and 324 that follow may need to be performed manually by the user.

The second network interface is turned on (step 322). The first network interface is turned off (step 324).

The IP address and the MAC address of the second network interface is set to the same IP address and the same MAC address as the first network interface (step 340).

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method for switching a mobile device from a first network interface that is wired based to a second network interface that is wireless in a local network environment, comprising the operations of:
utilizing an Internet Protocol (IP) address and Media Access Control (MAC) address for the first network interface of the mobile device;
assigning the same Internet Protocol address and MAC address used by the first network interface of the of the mobile device to the second network interface of the mobile device by writing, by the mobile device, said MAC address directly to the second network interface;
transitioning between said first and second communications interfaces by switching communications from said first network interface to said second network interface; and
having said second network interface renew the IP address with said MAC address after said transition.

2. The method of claim 1, further comprising the operation of sending an Address Resolution Protocol (ARP) message from the second network interface, subsequent to said setting step.

3. The method of claim 2, wherein said ARP message is a gratuitous ARP message.

4. The method of claim 3, wherein the local network environment includes a plurality of switches, and the gratuitous ARP message is sent from the second network interface to at least some of the plurality of switches.

5. The method of claim 2, additionally comprising signaling a new layer 2 attachment of the mobile terminal using a Logical Link Control (LLC) protocol, subsequent to said setting step.

6. The method of claim 1 additionally comprising:
reading the MAC address from the first network interface; and
said setting step operation comprises writing the MAC address to the second network interface.

7. The method of claim 1 further comprising:
receiving a user input that indicates a switch is desired from the first network interface to the second network interface; and
automatically turning on the second network interface and automatically turning off the first network interface in response to a receipt of the user input.

8. The method of claim 1, further comprising:
receiving a user input at least one of in lieu of and prior to a physical disconnection of the mobile terminal from the first network interface, the user input for indicating an impending switch from the first network interface to the second network interface; and
automatically turning on the second network interface and automatically turning off the first network interface in response to a receipt of the user input so as to prevent information loss due to a delay in a detection of the physical disconnection.

9. The method of claim 1, comprising:
periodically querying the first network interface for network parameters; and
transferring the network parameters to the second network interface when a switch is detected.

10. The method of claim 1, wherein at least one of the first network interface and the second network interface is at least one of an Ethernet interface and a Wireless Local Area Network (WLAN) interface.

11. The method of claim 1, further comprising extracting at least the IP address from the first network interface.

12. A mobile device capable of switching from a first network interface that is wired based to a second network interface that is wireless based in a local network environment, comprising:
a first network interface;
a second network interface;
an address reuse module for utilizing a same Internet Protocol (IP) and same Media Access Control (MAC) address by the mobile terminal for both the first network interface of the mobile device and the second network interface of the mobile device by assigning said IP and MAC address from said first network interface to said second network interface by writing said MAC address directly to the second network interface itself; and
a user input device for receiving a user input that implements a transition from said first network interface to said second network interface by switching communications from the first network interface to the second network interface and causing said second network interface to renew said IP address with said MAC address after said transitioning occurs.

13. The mobile terminal of claim 12, wherein said address reuse module sends a gratuitous Address Resolution Protocol (ARP) message from the second network interface, subsequent to setting the IP address of the second network interface to that of the first network interface.

14. The mobile terminal of claim 13, wherein the local network environment includes a plurality of switches, and the gratuitous ARP message is sent from the second network interface to at least some of the plurality of switches.

15. The mobile terminal of claim 12, wherein said address reuse module signals a new layer 2 attachment of the mobile terminal using a Logical Link Control (LLC) protocol, subsequent to setting the IP address of the second network interface to that of the first network interface.

16. The mobile terminal of claim 12, further comprising:
an interface management module for automatically turning on the second network interface and automatically turning off the first network interface in response to a receipt of the user input.

17. The mobile terminal of claim 12, further comprising:
an interface management module for automatically turning on the second network interface and automatically turning off the first network interface in response to a receipt of the user input so as to prevent information loss due to a delay in a detection of the physical disconnection.

18. The mobile terminal of claim 12, wherein at least one of the first network interface and the second network interface is at least one of an Ethernet interface and a Wireless Local Area Network (WLAN) interface.

19. An apparatus for switching a mobile device from a first network interface that is wired based to a second network interface that is wireless in a local network environment, comprising:
- a first network interface;
- a second network interface;
- a processor operatively connected to the first and second network interfaces, the processor configured to:
  - utilize an Internet Protocol (IP) address and Media Access Control (MAC) address for the first network interface of the mobile device;
  - assign the same Internet Protocol address and MAC address used by the first network interface of the of the mobile device to the second network interface of the mobile device by writing, by the mobile device, said MAC address directly to the second network interface;
  - transition between said first and second communications interfaces by switching communications from said first network interface to said second network interface; and
  - have said second network interface renew the IP address with said MAC address after said transition.

20. The apparatus of claim 19, wherein the second network interface is configured to send an Address Resolution Protocol (ARP) message.

21. The apparatus of claim 20, wherein said ARP message is a gratuitous ARP message.

22. The apparatus of claim 21, wherein the gratuitous ARP message is sent from the second network interface to at least some of a plurality of switches on an associated network.

23. The apparatus of claim 20, wherein the processor is operative to initiate signaling a new layer 2 attachment of the mobile terminal using a Logical Link Control (LLC) protocol.

24. The apparatus of claim 19, wherein the processor is further configured to:
- read the MAC address from the first network interface; and
- write the MAC address to the second network interface.

25. The apparatus of claim 19 wherein the processor is further configured to:
- receiving a user input that indicates a switch is desired from the first network interface to the second network interface; and
- automatically turning on the second network interface and automatically turning off the first network interface in response to a receipt of the user input.

26. The apparatus of claim 19, wherein the processor is further configured to:
- receive a user input at least one of in lieu of and prior to a physical disconnection of the mobile terminal from the first network interface, the user input for indicating an impending switch from the first network interface to the second network interface; and
- turn on the second network interface and turn off the first network interface in response to a receipt of the user input so as to prevent information loss due to a delay in a detection of the physical disconnection.

27. The apparatus of claim 19, wherein the processor is further configured to:
- periodically query the first network interface for network parameters; and
- transfer the network parameters to the second network interface when a switch is detected.

28. The apparatus of claim 19, wherein at least one of the first network interface and the second network interface is at least one of an Ethernet interface and a Wireless Local Area Network (WLAN) interface.

29. The apparatus of claim 19, wherein the processor is further configured to:
- extract at least the IP address from the first network interface.

30. A method for a mobile device capable of switching from a first network interface that is wired based to a second network interface that is wireless based in a local network environment, comprising:
- utilizing an address reuse module for a same Internet Protocol (IP) and a same Media Access Control (MAC) address by the mobile terminal for both a first network interface of the mobile device and a second network interface of the mobile device by assigning said IP and MAC address from a first network interface to said second network interface by writing said MAC address directly to the second network interface itself; and
- receiving a user input that implements a transition from said first network interface to said second network interface by switching communications from the first network interface to the second network interface and causing said second network interface to renew said IP address with said MAC address after said transitioning occurs.

31. The method of claim 30, further comprising sending a gratuitous Address Resolution Protocol (ARP) message from the second network interface, subsequent to setting the IP address of the second network interface to that of the first network interface.

32. The method of claim 31, wherein the local network environment includes a plurality of switches, and the gratuitous ARP message is sent from the second network interface to at least some of the plurality of switches.

33. The method of claim 30, further comprising sending a new layer 2 attachment of the mobile terminal using a Logical Link Control (LLC) protocol, subsequent to setting the IP address of the second network interface to that of the first network interface.

34. The method of claim 30, further comprising automatically turning on the second network interface and automatically turning off the first network interface in response to a receipt of the user input.

35. The method of claim 30, further comprising automatically turning on the second network interface and automatically turning off the first network interface in response to a receipt of the user input so as to prevent information loss due to a delay in a detection of the physical disconnection.

36. The method of claim 30, wherein at least one of the first network interface and the second network interface is at least one of an Ethernet interface and a Wireless Local Area Network (WLAN) interface.

* * * * *